United States Patent [19]

Shibuya et al.

[11] Patent Number: 5,260,921
[45] Date of Patent: Nov. 9, 1993

[54] MAGNETOOPTICAL RECORDING METHOD

[75] Inventors: Giichi Shibuya; Takashi Onodera; Suguru Takayama, all of Nagano, Japan

[73] Assignee: TDK Corporation, Tokyo, Japan

[21] Appl. No.: 951,269

[22] Filed: Sep. 28, 1992

[30] Foreign Application Priority Data

Oct. 1, 1991 [JP] Japan .................................. 3-280445

[51] Int. Cl.⁵ ..................... G11B 11/00; G11B 5/02; G11B 5/127
[52] U.S. Cl. ..................... 369/13; 360/59; 360/114
[58] Field of Search .......................... 369/13, 14, 126; 360/59, 114, 66, 109, 104; 365/122

[56] References Cited

U.S. PATENT DOCUMENTS

| 4,843,600 | 6/1989 | Miyajima et al. | 369/13 |
| 4,890,178 | 12/1989 | Ichihara | 360/114 |
| 5,095,470 | 3/1992 | Oka et al. | 369/13 |
| 5,148,415 | 9/1992 | Takeuchi | 369/13 |
| 5,197,049 | 3/1993 | Wehrenberg | 369/13 |

OTHER PUBLICATIONS

1990 Autumn National Convention Record, The Institute of Electronics, Information and Communication Engineers, Oct. 14, 1990. Magnetic Recording Head for Magnetic Field Modulation Magneto-Oprtical Disk Tester; S. Urabe, A. Ohya and K. Mikuriya.
Sanyo Technical Review, vol. 22, No. 3, Oct. 1990 Magneto-Optical Recording by Magnetic Field Modulation Method, S. Sumi et al.
Reports at the Institute of Electronics, Information and Communication Engineers, Study of Magnetic Head for Magneto-Optic Recording with Magnetic Field Modulation, Takehiro Nagaki, Feb. 23, 1988.
Id.; Development of Magneto-Optical Compact Disc Recorder Using An Active Head-to-Disc Spacing Control Method, S. Sugaya et al., Nov. 22, 1990.

Primary Examiner—Robert J. Pascal
Assistant Examiner—Ali Neyzari
Attorney, Agent, or Firm—Watson, Cole, Grindle & Watson

[57] ABSTRACT

Magneto-optical recording method for a magneto-optical recording disk using a non-flying magnetic head. The magnetic head produces a magnetic field extending from a primary magnetic pole and returning to an auxiliary magnetic pole while the disk is rotated. The magnetic head is spaced apart from one major surface of the disk such that the primary magnetic pole applies a magnetic field across the disk. Magneto-optical recording is effected in a magnetic field-modulation mode while properly controlling the projected area of the primary magnetic pole and the distance between the magnetic head and the disk surface. A satisfactory C/N is obtained in a consistent manner while jitter is reduced.

4 Claims, 4 Drawing Sheets

MAGNETOOPTICAL RECORDING METHOD

TECHNICAL FIELD

This invention relates to magneto-optical recording of a magneto-optical recording disk in a magnetic field-modulation mode.

BACKGROUND OF THE INVENTION

Optical disks draw great interest as high capacity information carrying media. Among the optical disks are magneto-optical recording disks of the magnetic field-modulation mode which are expected for their use as data files or the like. The magnetic field-modulation mode is to carry out recording by positioning an optical head and a magnetic head on opposite sides of a disk, directing laser light from the optical head to the recording layer of the disk in a DC manner to increase its temperature and at the same time, applying a modulated magnetic field across the recording layer from the magnetic head. Since this mode allows for over-write recording, there is a possibility to apply it to rewritable compact disks.

The magnetic heads used in the magnetic field-modulation mode include flying magnetic heads adapted to float on the disk surface in response to disk rotation like magnetic heads for hard disk equipment and non-flying magnetic heads spaced at a certain distance from the disk surface independent of disk rotation.

In this disclosure, non-flying magnetic heads are of concern. The non-flying magnetic heads include two types, stationary type wherein the head is spaced from the disk surface at a fixed distance and sliding type wherein the head is mounted on a slider such that the head is retracted a fixed distance from the surface of the slider in sliding contact with the disk whereby the head is maintained at the fixed distance from the disk surface during operation. In general, as the distance between the disk and the magnetic head decreases, a more intense magnetic field is applicable to the disk. The stationary magnetic head, however, can collide against the disk because the distance between the disk and the head varies due to axial run-out of the disk caused by its warpage and distortion. Then in some cases, a displacement sensor is provided in order to keep a constant disk-to-head distance. In contrast, the sliding type magnetic head can advantageously provide a constant disk-to-head distance.

The non-flying magnetic heads are suitable for use with those disks operated at relatively low rotational speeds such as compact disks (CD) since their performance does not depend on the number of disk revolutions. They are relatively free from troubles associated with irregularities and deposits on the disk surface. Additionally, they are manufactured at a low cost if the displacement sensor can be omitted.

SUMMARY OF THE INVENTION

An object of the present invention is to carry out magneto-optical recording in a magnetic field-modulation mode using a non-flying magnetic head while improving C/N and stability thereof and reducing jitter.

According to the present invention, there is provided a magneto-optical recording method for a magneto-optical recording disk having a recording layer using a non-flying magnetic head. The magnetic head produces a magnetic field extending from a primary magnetic pole and then back to an auxiliary magnetic pole while the disk is rotated. The magnetic head is positioned above one major surface of the disk such that the primary magnetic pole applies a magnetic field across the disk. Magneto-optical recording is effected in a magnetic field-modulation mode under the conditions:

$$0.04 \text{ mm} \leq h \leq 0.3 \text{ mm}$$

$$Ps \leq 0.16 \pi \text{ mm}^2, \text{ and}$$

$$0.4 \pi \leq Ps/h^2 \leq 8 \pi$$

wherein
h is the distance between the magnetic layer of the disk and the primary magnetic pole, and
Ps is the area of the primary magnetic pole projected perpendicular to the disk major surface.

The present invention carries out magneto-optical recording in a magnetic field-modulation mode while properly controlling the area of the primary magnetic pole, the distance between the magnetic head and the disk surface and the relation therebetween. A satisfactory carrier-to-noise (C/N) ratio is obtained in a consistent manner while jitter is reduced.

BRIEF DESCRIPTION OF THE DRAWINGS

The above and other objects, features and advantages of the present invention will be better understood by reading the following description taken in conjunction with the accompanying drawings.

DESCRIPTION OF THE PREFERRED EMBODIMENT

The present invention is addressed to magneto-optical recording of a magneto-optical recording disk in a magnetic field-modulation mode. The disk is comprised of a substrate and a recording layer thereon and has one major surface on the recording layer side and another or rear major surface as will be described later in conjunction with FIG. 2. Generally in this mode of recording, a magnetic head is spaced apart from the one major surface of the disk and an optical head is spaced apart from the rear major surface of the disk. The optical head emits laser light of a predetermined intensity to the recording layer through the substrate to define a laser spot in the recording layer while the magnetic head applies a modulated magnetic field across the laser spot in the recording layer, thereby achieving recording. The magnetic head and the optical disk which are in fixed alignment are moved in unison in a radial direction of the disk for providing access to a selected track while the disk is rotating.

The magnetic head used in the magneto-optical recording method of the invention includes a core having a primary magnetic pole and an auxiliary magnetic pole and applies a magnetic field from the primary magnetic pole to the recording layer of the disk in a substantially perpendicular direction. Past the recording layer, the magnetic flux changes its direction and returns to the auxiliary magnetic pole to define a closed loop. The magnetic head core is not particularly limited in shape although pot, E and U-shaped cores are preferred because they can generate a high-frequency magnetic field with low recording current.

Figure 1A:
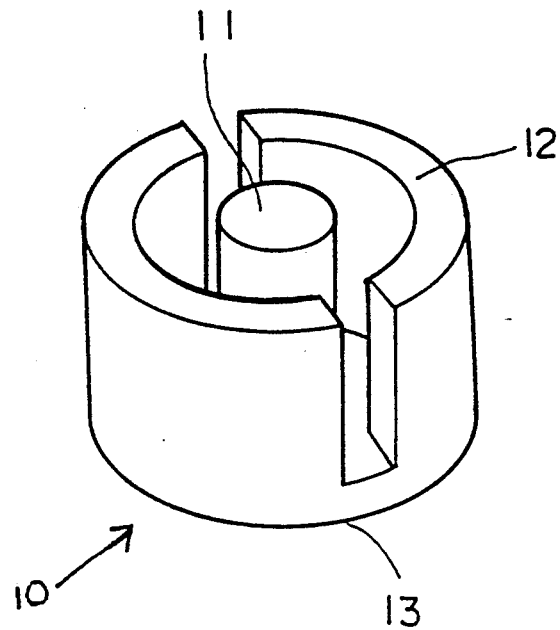
FIG. 1a is a perspective view of a pot-shaped magnetic head used in the magneto-optical recording method of the invention.

FIG. 1a shows one preferred example of the pot-shaped core. The pot-shaped core 10 is illustrated as comprising a cylindrical center segment 11 for forming a primary magnetic pole, a generally annular segment 12 surrounding the center segment 11 for forming an auxiliary magnetic pole, and a circular back segment 13 for magnetically coupling the segments 11 and 12. The center segment 11 is coaxial with the back segment 13. The annular segment 12 is coincident with the back segment 13. The annular segment 12 includes slots in the circumferential wall for guiding leads of a winding (not shown) on the center segment 11. While the core temperature increases during operation of the magnetic head, the heated air can flow outward through the slots due to the air flow induced by the rotating disk on its surface. The slots are thus effective for preventing the core from deteriorating its magnetic properties by a temperature rise. For reducing the core size, the annular segment 12 should preferably be up to 1.5 mm in radial thickness.

Figure 1B:
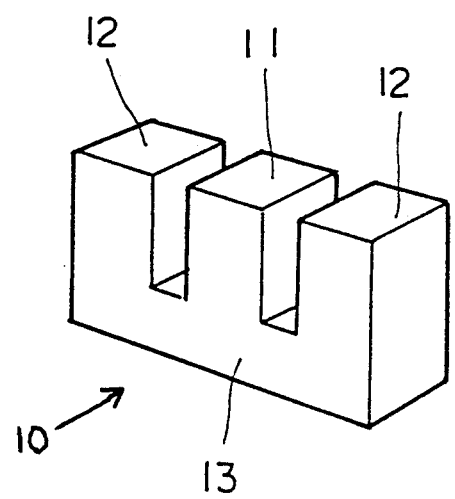
FIG. 1b is a perspective view of a E-shaped magnetic head used in the inventive method.

FIG. 1b shows a E-shaped core which is preferred for electromagnetic properties, efficient heat release and ease of manufacture. The E-shaped segment 10 is illustrated as comprising a center segment 11 for forming a primary magnetic pole, a pair of side segments 12, 12 symmetrically disposed on opposite sides of the center segment 11 for forming auxiliary magnetic poles, and a back segment 13 for magnetically coupling the center and side segments 11 and 12. The segments 11 and 12 are of rectangular column shape in the illustrated embodiment although they may take a cylindrical or other shape.

A U-shaped core is equal to the E-shaped core except that one side segment is omitted and thus has the same benefits as the E-shaped core.

In each of these cores, the free (or distal) end surface area of the auxiliary magnetic pole-forming core segment is generally greater than the free end surface area of the primary magnetic pole-forming core segment. The core segments should preferably have sufficient dimensions to ensure strength and prevent magnetic flux leakage in a lateral direction. A winding is usually wound on the center core segment 11 though not shown.

The primary and auxiliary magnetic pole-forming core segments have a flat free (or distal) end surface in the illustrated examples although they may have a curved free end surface. Also, the primary and auxiliary magnetic pole-forming core segments need not always be constant in cross-sectional area from the back segment to the free end. For example, they may be tapered such that the cross sectional area gradually decreases from an intermediate position to the free end. Further, in such a tapered configuration, that portion of the primary magnetic pole-forming core segment which is disposed near the free end may be formed of a metal having a higher magnetic permeability and higher saturation magnetic flux density than the remaining core material. Then the core can produce a magnetic field of a higher intensity toward the disk like the conventional ring-shaped metal-in-gap (MIG) type magnetic head.

These cores are generally formed of soft magnetic materials including various ferrites and metals although Mn-Zn ferrite, Ni-Zn ferrite or the like is preferred for high electrical resistivity and high-frequency response. Since the pot-shaped core of a miniature size for use in the magneto-optical recording head is generally manufactured by machining a sintered ferrite body to a desired configuration as by ultrasonic milling, it is less amenable to large-scale, low-cost production. In this regard, the E-shaped core is advantageous for large-scale production since it can be produced by molding a ferrite material to a desired shape followed by sintering and optional simple machining on the sintered body.

According to the present invention, magneto-optical recording is carried out in a magnetic field-modulation mode. As shown in FIG. 3, the head 10 is spaced apart from the disk 1 which has the configuration shown in FIG. 2 as will be described later. Optimum magneto-optical recording requires the conditions:

$$0.04 \text{ mm} \leq h \leq 0.3 \text{ mm}$$

$$Ps \leq 0.16 \ \pi mm^2, \text{ and}$$

$$0.4 \ \pi \leq Ps/h^2 \leq 8\pi, \text{ preferably } 0.4\pi \leq Ps/h^2 \leq 6.3\pi$$

wherein h is the distance between the magnetic layer 5 of the disk 1 and the primary magnetic pole 11 of the magnetic head 10, and Ps is the area of the primary magnetic pole 11 projected perpendicular to the disk 1 major surface.

The area Ps of the primary magnetic pole projected perpendicular to the disk major surface is given by assuming a cylinder or cone circumscribing the peripheral surface of a winding portion of the primary magnetic pole-forming core segment and cutting the cylinder or cone in a plane parallel to the disk major surface and containing the primary magnetic pole-forming core segment distal end, the cross-sectional area of the cylinder or cone being the projection area. Thus in the case of the pot-shaped core of FIG. 1a having the primary magnetic pole-forming center segment 11 of a circular cross section, Ps is equal to the circular cross-sectional area. In the case of the E-shaped core of FIG. 1b having the primary magnetic pole-forming center segment 11 of a rectangular cross section, Ps is the area of a circle having a diameter corresponding to the diagonal of the rectangular cross section.

The primary magnetic pole having a projected area Ps of up $0.16\pi$ mm$^2$ is effective in reducing the inductance and improving high-frequency properties, thus enabling high density recording.

When the magnetic layer to primary magnetic pole distance h is up to 0.3 mm, the variation of C/N which depends on a change in the distance between the primary magnetic pole and the disk major surface can be minimized. With h >0.3 mm, the head produces a magnetic field of insufficient intensity in the recording spot. With h <0.04 mm, sliding type heads have the likelihood that since the disk surface flatness has a certain limit of precision, head crash occur due to entry of dust between the core and the disk and stationary heads have the likelihood that the core collide against the rotating disk during operation. Preferably, h is at least 0.1 mm.

It is to be noted that during rotation, the magneto-optical recording disk experiences disturbances such as an axial run-out due to its warpage or the like and dust deposition, which causes a change in the primary magnetic pole to disk distance. The distance h defined herein includes such a change caused by axial run-out and other disturbances. The axial run-out is normally within ±0.1 mm.

If parameter $Ps/h^2$ exceeds $8\pi$, the magnetic field intensity within the recording spot in the disk loses evenness. More particularly, the magnetic field intensity at the edge of the recording spot becomes higher than at the center thereof so that the magnetic field is less utilized for recording. The term "recording spot" is defined by the image at the disk major surface of the primary magnetic pole projected perpendicular to the disk major surface.

If parameter $Ps/h^2$ is less than $0.4\pi$, that is, projected area Ps is too small relative to distance h, the magnetic field attenuates its intensity at an increased rate from the center to the edge of the recording spot so that no sufficient magnetic field intensity is available in the recording spot. Then a substantial change of the magnetic field intensity occurs on the disk surface for a change in distance h cause by external disturbances.

If parameter $Ps/h^2$ is within the above-defined range, a magnetic field of even intensity is available in the recording spot. Then a larger margin is allowed for the alignment between the recording spot and the laser spot, facilitating the manufacture of recording apparatus as well as the maintenance and control thereof. This minimizes the change in the magnetic field intensity on the disk surface caused by a change in the distance between the magnetic head and the disk surface, increasing the tolerance with respect to a change in the primary magnetic pole to disk distance caused by disturbances like axial run-out and dust deposition. The evenness of magnetic field intensity in the recording spot offers a high C/N ratio in a stable manner and improves the rise and fall of a reproduced signal, resulting in reduced jitter.

The magnetic field intensity in the recording spot is preferably in the range of about 100 to 400 Oe although it is not particularly limited in the practice of the invention.

The magnetic head may be constructed by providing a winding on a core, mounting the core in a casing, and securing the casing in a recording/reproducing deck such that the core is spaced a fixed distance from the surface of a disk to be loaded or by mounting the wound core in a slider such that the core is retracted a fixed distance from the surface of the slider in sliding contact with the disk and mounting the slider in a recording/reproducing deck for sliding contact with the disk.

The structure of the magneto-optical recording disk used herein is not particularly limited as long as the disk is of the single side recording type because the distance between the magnetic head primary magnetic pole and the disk surface should be extremely small.

Figure 2:
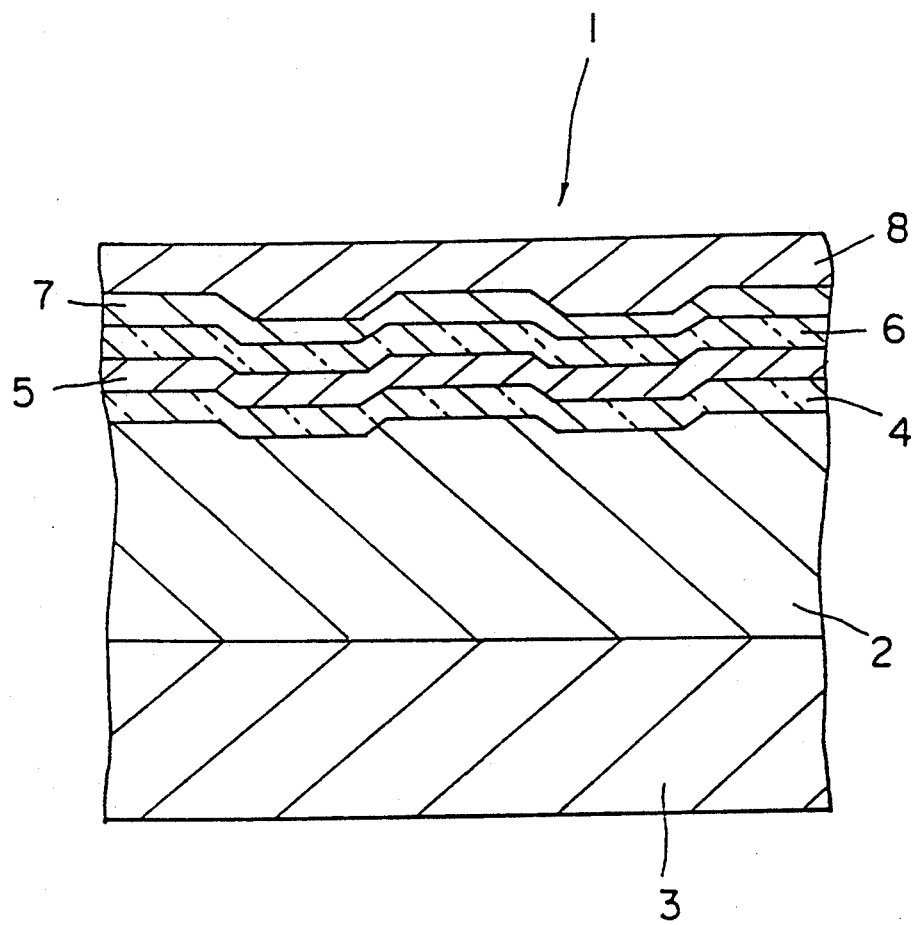
FIG. 2 is a cross-section of one exemplary magneto-optical recording disk used in the inventive method.
Figure 3:
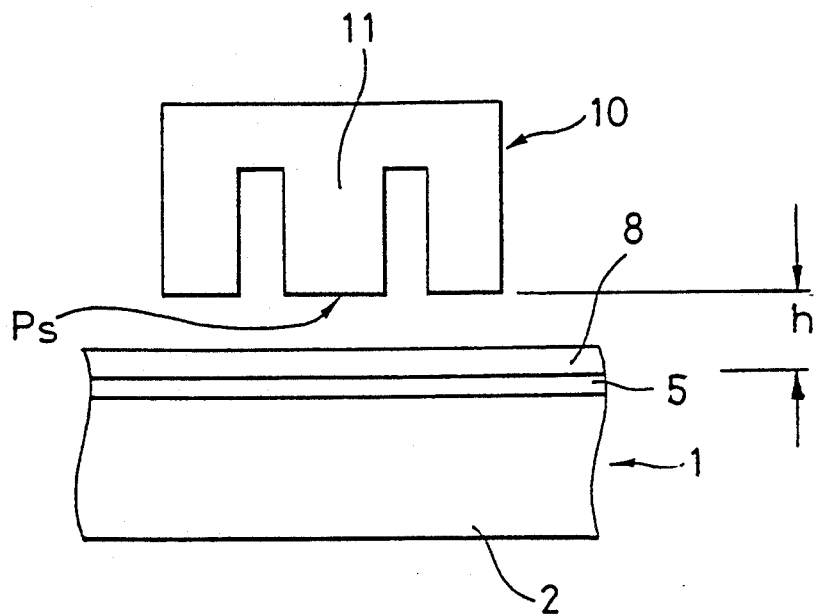
FIG. 3 schematically illustrates the magnetic head spaced apart from the disk.

Referring to FIG. 2, there is illustrated one example of a magneto-optical recording disk of the single side recording type. The disk 1 includes a protective layer 4, a recording layer 5, another protective layer 6, a reflective layer 7 and a protective coat 8 laid up on one major surface of a substrate 2 in the described order. The disk 1 may have a hard coat 3 on the rear surface of the substrate 2 if desired. The hard coat may be formed on the outer and inner peripheral edges of the disk in addition to the disk major surface.

The substrate 2 may be formed of any desired material which is transparent, for example, glass and resins. Examples of the transparent resin include polycarbonate resins, acrylic resins, amorphous polyolefin resins, and styrene resins. The surface of the substrate 2 on which the recording layer 5 is formed is provided with grooves and pits for tracking purposes, if desired.

The transparent hard coat 3 formed on the rear surface of the substrate 2 may be formed of a radiation curable resin as is the protective coat 8. The hard coat 3 is preferably about 1 to 30 μm, especially about 3 to 10 μm. The transmittance of recording or reproducing light by the substrate 2 through the hard coat 3 should preferably be at least 80%, especially at least 85%.

The protective layers 4 and 6 are effective for improving the C/N and corrosion resistance of the recording layer 5. Preferably the lower protective layer 4 is about 30 to 300 nm thick and the upper protective layer 6 is about 10 to 50 nm thick. These protective layers may be inorganic thin films which are formed from oxides, carbides, nitrides, sulfides or mixtures thereof by various vapor phase deposition techniques such as sputtering, evaporation and ion plating, preferably by sputtering.

If desired, an intermediate layer of dielectric material may be provided between the protective layer 4 and the recording layer 5 for the purposes of improving C/N and corrosion resistance.

The recording layer 5 is one in which information is magnetically recorded using a modulated magnetic field and the recorded information is reproduced through magneto-optic conversion. The recording layer 5 may be formed of any desired material which is capable of such magneto-optical recording. Preferably, it is prepared by depositing an alloy containing a rare earth metal element, especially a rare earth metal-transition metal alloy by sputtering, evaporation or ion plating, preferably by sputtering, to form an amorphous film. The preferred rare earth metal is at least one element of Tb, Dy, Nd, Gd, Sm, and Ce. The preferred transition metals are Fe and Co. Then the alloy preferably contains 65 to 85 atom% of Fe and Co in total, with the balance being essentially a rare earth metal or metals. Some preferred examples of the recording layer composition are TbFeCo, DyTbFeCo, NdDyFeCo, and NdGdFeCo. The recording layer may contain up to 10 atom % of Cr, Al, Ti, Pt, Si, Mo, Mn, V, Ni, Cu, Zn, Ge, Au or the like. It may further contain up to 10 atom % of another rare earth metal element such as Sc, Y, La, Ce, Pr, Pm, Sm, Eu, Ho, Er, Tm, Yb, and Lu. The recording layer 5 is generally about 10 to 1,000 nm thick.

For the reflective layer 7, a metal such as Cu, Au, Ag, Pt, Al, Ti, Cr, Ni, and Co or an alloy or compound thereof is preferred. The reflective layer 7 may be formed in the same manner as the recording layer 5. It is preferably about 30 to 200 nm thick.

No limit is imposed on the structure of the optical head. A choice may be made of optical heads commonly used in magneto-optical recording. Since the quality of signals recorded in the magnetic field-modulation mode is largely affected by the leakage magnetic flux from an actuator for moving the optical head, it is preferred to use an optical head equipped with a magnetic shield for restraining the leakage magnetic flux.

Such an optical head is disclosed in Japanese Patent Application No. 195771/1991.

EXAMPLE

An example of the present invention is given below by way of illustration and not by way of limitation. A magnetic head having a pot-shaped core as shown in FIG. 1a was fabricated. The head had the following specifications.
Core material: Mn-Zn ferrite
Coil winding: 30 turns
Inductance: 5 μH
Core outer diameter: 5.0 mm
Center core segment diameter D: 0.5 mm
Ps: 0.0625 π mm²

Since the center core segment forming the primary magnetic pole was a straight cylinder, the cross-sectional area of the center core segment was equal to the projected area Ps of the primary magnetic pole.

A magneto-optical recording disk of the structure shown in FIG. 2 was fabricated. The substrate was formed from a polycarbonate resin to an outer diameter of 86 mm, an inner diameter of 15 mm and a thickness of 1.2 mm. The hard coat 3 was formed from a UV-curable resin to a thickness of 5 μm at the end of curing. The lower protective layer 4 was of SiNx and 40 nm thick. The recording layer 5 was of the composition: $Tb_{23}Fe_{72}Co_5$ and 20 nm thick. The upper protective layer 6 was of the same composition as the lower protective layer 4 and 20 nm thick. The reflective layer 7 was of Al alloy and 80 nm thick. The protective coat 8 was formed from a UV-curable resin to a thickness of 5 μm at the end of curing.

Figure 4:
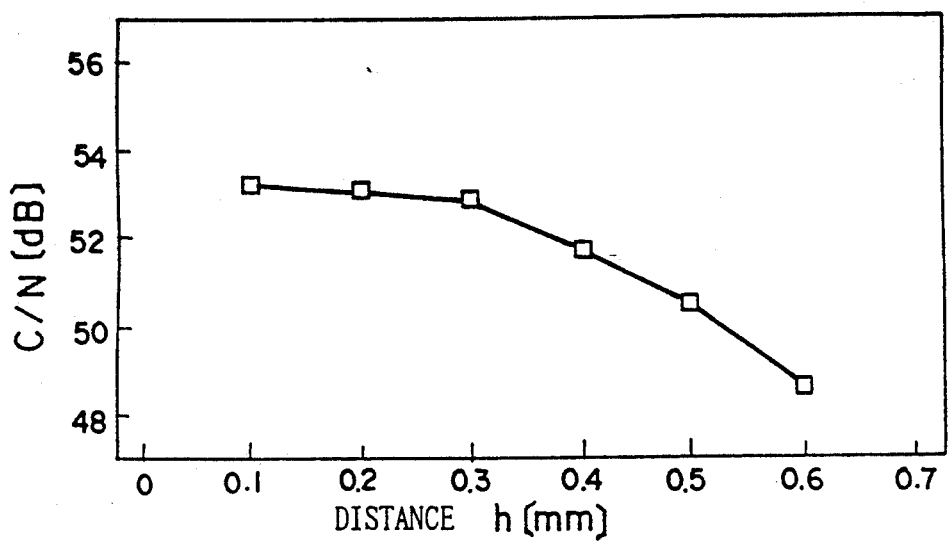
FIG. 4 is a diagram showing C/N as a function of the magnetic head primary magnetic pole-to-disk distance (h).

Using the magnetic head and the magneto-optical recording disk, magneto-optical recording was carried out to measure C/N at a varying distance h between the magnetic head primary magnetic pole and the disk. The results are plotted in FIG. 4. At the C/N measurement site, the disk underwent an axial run-out out of ±15 μm. The C/N value in FIG. 4 is an average of measurements at the site.

Assume that the maximum axial run-out of a magneto-optical recording disk is ±0.1 mm. If the average distance between the primary magnetic pole and the disk is 0.2 mm, then h ranges from 0.1 mm to 0.3 mm and $Ps/h^2$ ranges from 0.69π to 6.25π. Then, FIG. 4 gives a C/N value of from 53.2 dB to 52.8 dB, which corresponds to a C/N variation of 0.4 dB. If the average distance between the primary magnetic pole and the disk is 0.3 mm, then h ranges from 0.2 mm to 0.4 mm and $Ps/h^2$ ranges from 0.39π to 1.56π. Then the C/N value is from 53.0 dB to 51.7 dB, which corresponds to a C/N variation as large as 1.3 dB.

As to the C/N variation appearing in magneto-optical recording, those variations associated with a laser diode and temperature factor sum to about 2 dB. If a variation of more than 1 dB caused by the magnetic head is added, the overall variation becomes more than 3 dB. However, if distance h is limited to 0.3 mm or less, then high C/N values are consistently obtained despite of an axial run-out as seen from FIG. 4.

Jitter measurements showed a jitter increase in proportion to a C/N lowering.

Next, using a computer, magneto-optical recording was simulated based on the magnetic head and disk of the above-mentioned construction. For this simulation, an electromagnetic field analysis software relying on the finite element and finite integration methods (MAGNA FIM by CRC Company) was used. The diameter D of the primary magnetic pole was varied from 0.3 mm to 1.2 mm (Ps=0.0225π mm² to 0.36π mm²).

In this simulation, the magnetic flux densities Bc and Be at the center and edge of the recording spot in the disk, respectively, were examined for both cases of h=0.1 mm and h =0.2 mm. The results are shown in FIG. 5.

Figure 5:
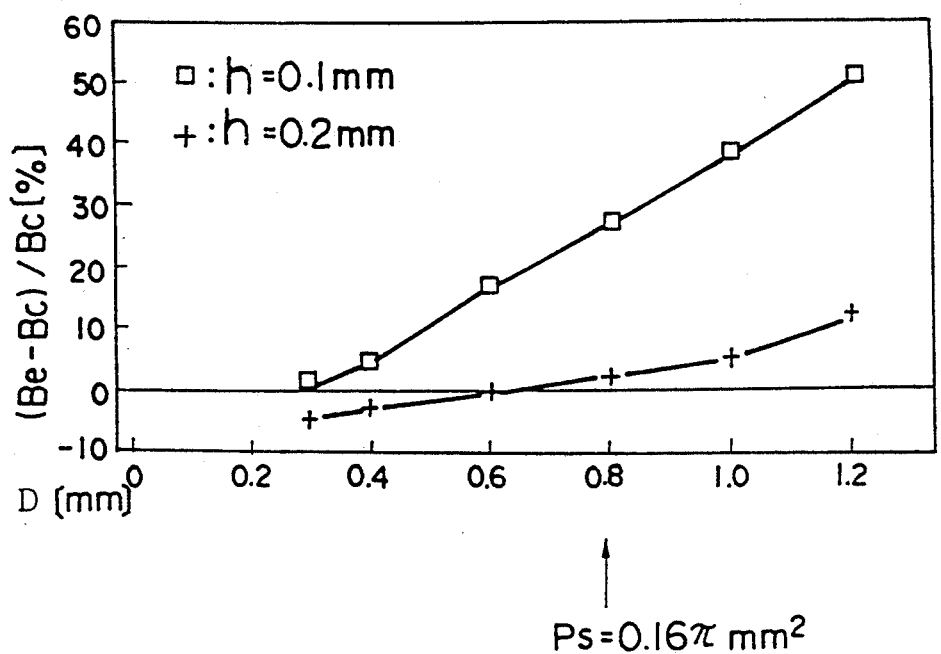
FIG. 5 is a diagram showing how the magnetic flux density within a recording spot varies with the area of the magnetic head primary magnetic pole.

In the graph of FIG. 5, the diameter D of the center core (primary magnetic pole) is on the abscissa and the diameter corresponding to the Ps upper limit of 0.16π mm² is indicated by an arrow. On the ordinate, (Be - Bc)/Bc representative of the unevenness of magnetic flux density in the recording spot is plotted.

As seen from FIG. 5, for h=0.2 mm, an approximately even magnetic field intensity is available in the recording spot. For h=0.1 mm, however, although Ps is up to 0.16π mm² (D=0.8 mm), if $Ps/h^2$ exceeds 8π (D≈0.57 mm), then the magnetic flux density Be at the edge of the recording spot is increased to such an extent that the unevenness of magnetic flux density in the recording spot exceeds 15%, suggesting inefficient use of the magnetic flux.

For E-shaped cores having a similar value of Ps, equivalent results were obtained over the range of h=0.04 to 0.3 mm, Ps≦0.16π mm², and $Ps/h^2$ =0.4π to 8π.

The effectiveness of the present method is evident from the results of Example.

There has been described a magneto-optical recording method in a magnetic field-modulation mode wherein the dimensions of the magnetic head and the distance between the magnetic head and the disk are optimized, thereby improving C/N and the stability thereof and reducing jitter. Since a magnetic field of uniform intensity is available over the recording spot, the magnetic field is fully utilized for recording, allowing the use of a magnetic head of a lower magnetic excitation power.

While the preferred embodiment of our invention has been described fully in order to explain its principles, it is understood that various modifications or alterations may be made without departing from the scope of the invention as set forth in the appended claims.

We claim

1. A magneto-optical recording method for a magneto-optical recording disk having a recording layer using a magnetic head having a primary magnetic pole and an auxiliary magnetic pole, said method comprising the steps of:
    placing the magnetic head above one major surface of the disk such that said primary magnetic pole applies a magnetic field across the disk, and
    effecting magneto-optical recording in a magnetic field-modulation mode under the conditions:

0.04 mm≦h≦0.3 mm

Ps≦0.16π mm², and 0.4π ≦Ps/h²≦8π wherein
    h is the distance between the magnetic layer of the disk and said primary magnetic pole, and
    Ps is the area of said primary magnetic pole projected perpendicular to the disk major surface.

2. The method of claim 1 wherein said magnetic head has a pot-shaped core.

3. The method of claim 1 wherein said magnetic head has a E-shaped core.

4. The method of claim 1 wherein said magnetic head has a U-shaped core.

* * * * *